Dec. 13, 1938.  F. A. WATKINS  2,139,919
AUTOMOBILE SAFETY SYSTEM
Filed Jan. 11, 1936
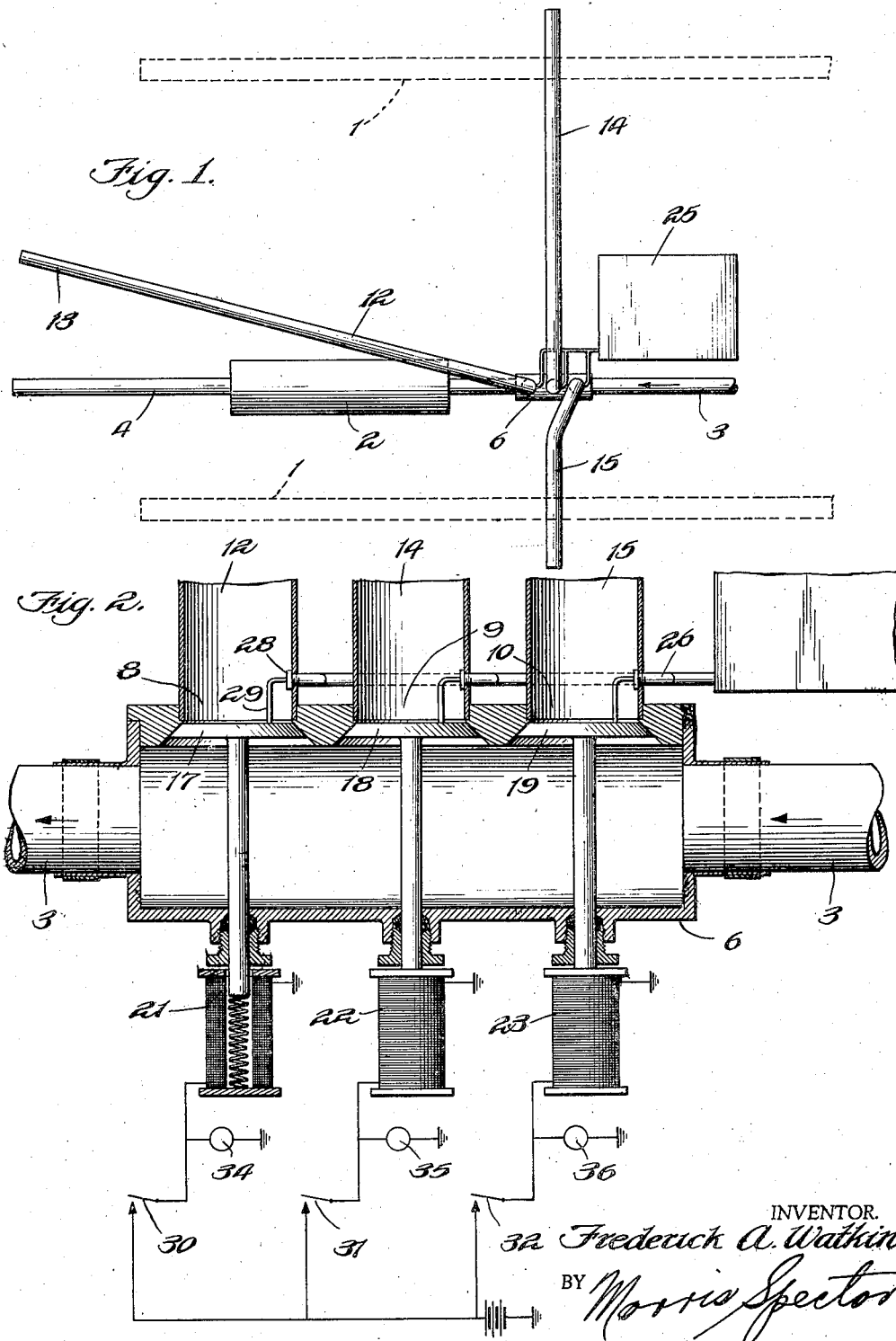
INVENTOR.
Frederick A. Watkins
BY Morris Spector
ATTORNEY.

Patented Dec. 13, 1938

2,139,919

UNITED STATES PATENT OFFICE 2,139,919

AUTOMOBILE SAFETY SYSTEM

Frederick A. Watkins, Highland Park, Ill.

Application January 11, 1936, Serial No. 58,655

4 Claims. (Cl. 177—329)

This invention relates to automobile signalling devices for indicating an intention to make a turn.

It is one of the objects of the present invention to provide a signalling device whereby the exhaust from an engine is utilized to give a visual indication of the direction in which a motorist is planning to turn. It is a further object of the present invention to supplement the visual signal with an audible signal, also produced by the exhaust gases.

The exhaust from the engine of an automobile escapes with considerable force, and if directed may be made to shoot out for some distance from its point of escape. It is an object of the present invention to provide means for selectively directing exhaust gases to the right or to the left of the automobile and adding coloring matter thereto, for indicating an intention to make a turn.

The attainment of the above and further objects of the present invention will be apparent from the following specification taken in conjunction with the accompanying drawing forming a part thereof.

In the drawing:

Figure 1 is a fragmentary diagrammatic view of a portion of an automobile to which the present invention is applied; and Figure 2 is an enlarged diagrammatic view illustrating the valves and valve action.

Reference may now be had more particularly to Figure 1 in the drawing. At 1—1 is illustrated the side frames of a conventional automobile. A muffler is illustrated at 2, said muffler receiving the exhaust gases from the exhaust manifold of the internal combustion engine of an automobile by way of a pipe 3, and discharging the gases to the atmosphere by way of a pipe 4. On the intake side of the muffler 2, that is, between the muffler and the exhaust manifold, there is provided a valve box 6, which is illustrated particularly in Figure 2. The valve box consists of a slightly enlarged chamber interposed in the path of the gases flowing through the pipe 3, said chamber offering substantially no impediment to the flow of the gases. The box 6 is provided with three side outlets, indicated at 8, 9 and 10. The outlet 8 communicates with a pipe 12 that leads to the back of the automobile and slightly upward, as indicated by the end 13, ultimately opening to the atmosphere at a point approximately centrally of the back of the automobile and approximately three feet above the ground. The outlet 9 has a pipe 14 connected thereto which extends to the left of the automobile and is of a sufficient length to reach to the outside edge of the automobile body, preferably just below the running board. A similar pipe 15 is connected with the outlet 10 and passes to the right of the automobile also, preferably, just below the running board. It is, however, to be understood that the pipes 14 and 15 may be terminated considerably to the rear of the running board, even rearwardly of the rear wheel. In any event, the pipes 14 and 15 direct gases to the left, and to the right, respectively, of the automobile.

The valve box 6 has three valves, indicated at 17, 18 and 19, normally closed by springs, and electro magnetically opened by electro magnets indicated at 21, 22 and 23, respectively. When the electro magnets are not energized the valves are closed, and the exhaust gases pass through the valve box to the muffler. When one of the valves is opened, upon energization of the corresponding electro magnet, gases will flow from the exhaust pipe 3, through the corresponding openings 8, 9 or 10, and out through the corresponding pipes 12, 14 and 15. The gases will flow over such path in preference to flowing through the muffler, since such path offers less resistance than does the path through the muffler 2. A receptacle 25 containing a suitable powder, preferably white powder, is provided adjacent to and immediately above the valve box 6. Suitable conduits, indicated at 26, connect this receptacle to the respective pipes 8, 9 and 10, so that small portions of the white powder may flow from the receptacle into the corresponding pipes. Amongst the powders that may be mentioned are finely divided zinc oxide powder, finely divided fuller's earth, and finely divided pumice powder. The first mentioned powder will impart a distinctly white color to the gases. The fuller's earth will impart a yellowish tint to the gases, the pumice powder will impart a white bordering on gray color to the gases. The invention is, however, not limited to these precise powders, as any of the other powders well known in the art and used in aeroplane sky-writing may be used. Each of the valves 17, 18 and 19 includes an extension member 28 that slides over an opening in the corresponding pipes, to control the opening and closing of the point of admission of the white powder into the pipe from the receptacle 25. The extension 28 consists of a slidable block carried by a rod 29 secured to the valve, which block normally closes the point of communication of the pipe 26 with the pipes 12, 14 and 15. When any valve is open, the corresponding block 28 is shifted downwardly to uncover the opening from the point 26 to the corresponding pipe 12, 14 or 15, and thus permit the flow of the white powder. This white powder mixes with the exhaust gases, thus coloring the same and rendering them clearly and distinctly visible.

The electro magnets 21, 22 and 23 are controlled by normally open electric switches 30, 31 and 32, respectively. When any one of these switches is closed, the corresponding electro magnet is energized. The switches are located adjacent the driver's seat and are preferably manually operated. If desired, the switch 30 may be located so that it is automatically closed when the brake is applied. The switches 31 and 32 may be controlled from the steering wheel. The preferred arrangement, however, for the switches 31 and 32 is to have them manually controlled independently of the steering wheel. If the driver intends to stop, or to make a left turn, or a right turn, he actuates the corresponding switch 30, 31, or 32, thus opening the corresponding valve and directing a stream of exhaust gases, colored by minute amounts of white powder, in such a way as to indicate what action is to be taken. At the same time there is established a passageway for the exhaust gases by-passing the muffler so that the exhaust gases produce considerable noise, thereby giving also an audible signal to the effect that some change is to be made. This is particularly useful to place pedestrians on their guard.

While I have shown the valve box 6 located between the muffler and the exhaust manifold, so as to obtain the benefit of an audible signal, I may, if desired, locate this valve box in the pipe 4, rather than in the pipe 3, thereby obtaining silent action. When this is done the valves 17, 18 and 19, must be arranged in such a way that when they open the passageway to the corresponding pipes 12, 14 and 15 they also close the outlet at the pipe 4 because otherwise the gases may continue to flow outwardly through the usual outlet 4, rather than through the signalling outlets.

The white exhaust gases will be immediately visible at day time, by far more visible than the ordinary electric signal light. If desired means may be provided for illuminating the colored exhaust gases, thereby rendering them also visible at night time. Such illuminating means may comprise electric signal lamps, indicated at 34, 35 and 36, so arranged as to be energized when the associated electro magnet is energized, those lights being located in such a position as to illuminate the colored exhaust gases.

In compliance with the requirements of the patent statutes I have here shown and described a preferred embodiment of my invention. It is, however, to be understood that the invention is not limited to the precise construction here shown, the same being merely illustrative of the principles of the invention. What I consider new and desire to secure by Letters Patent is:

1. In an automobile driven by an internal combustion engine, signalling means comprising means for directing exhaust gases from the right hand side or from the left hand side of the automobile selectively, means at the automobile driver's station for controlling said last named means and means for adding coloring matter to the exhaust gas to increase its visibility.

2. In an automobile driven by an internal combustion engine, signalling means comprising means for selectively directing exhaust gases from the automobile at opposite sides thereof, and means for adding coloring matter to the exhaust gas to increase its visibility.

3. In an automobile driven by an internal combustion engine, means for indicating an intention to make a turn, said indicating means comprising means controlled by the driver for selectively directing the engine exhaust gases to discharge on the right hand side of the automobile or the left hand side thereof depending upon the direction of the intended turn, and means for adding coloring matter to the exhaust gases after they leave the engine.

4. In a vehicle driven by an internal combustion engine and having means including a sound muffler through which the products of combustion are discharged, means for giving an audible signal comprising a by-pass for the muffler and means for closing and opening said by-pass, and means for coloring the gases discharged through the by pass, to increase visibility.

FREDERICK A. WATKINS.